Feb. 25, 1936.    J. M. SIMPSON    2,032,335
FREEWHEELING ATTACHMENT FOR AUTOMOBILES
Filed May 4, 1931    4 Sheets-Sheet 1

Inventor
John M. Simpson,
By Hood & Hahn
Attorneys

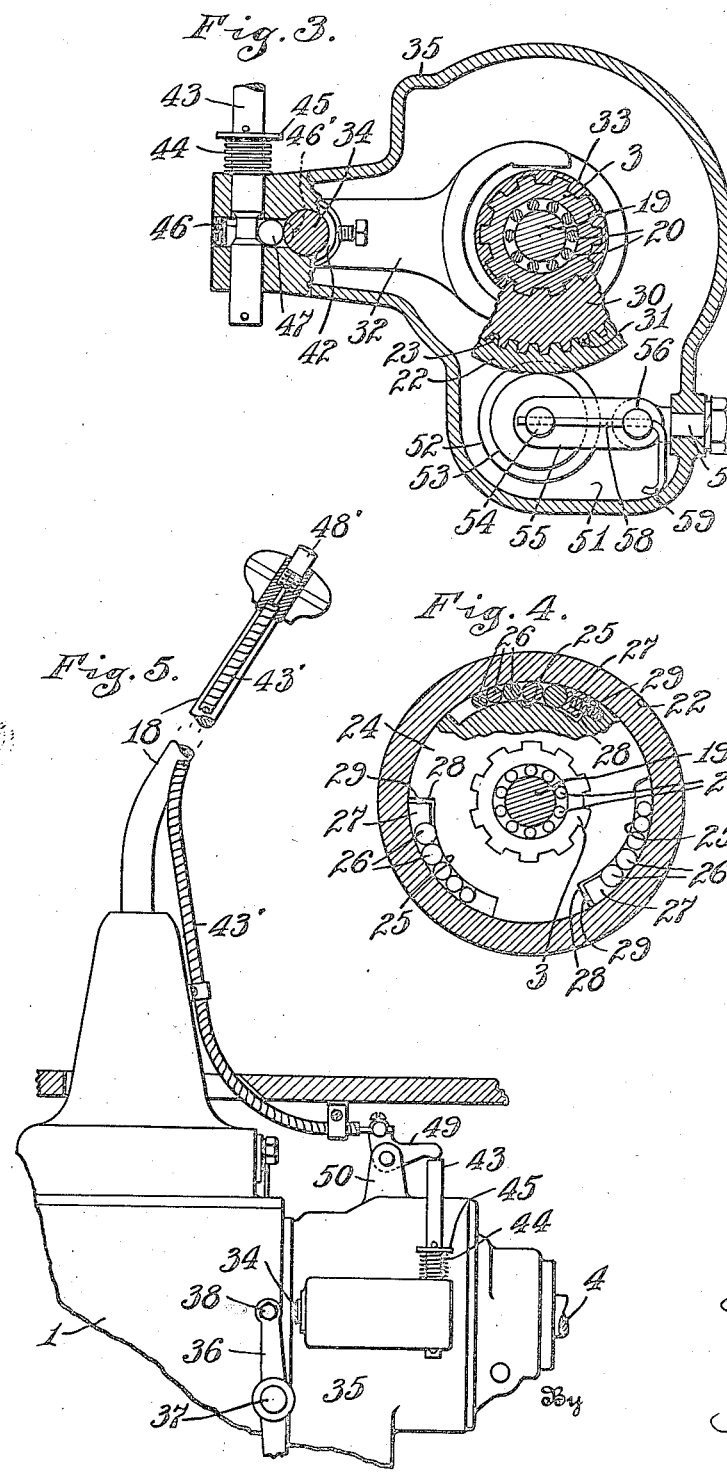

Feb. 25, 1936.    J. M. SIMPSON    2,032,335
FREEWHEELING ATTACHMENT FOR AUTOMOBILES
Filed May 4, 1931    4 Sheets-Sheet 3

Inventor
John M. Simpson,

By Hood + Hahn.
Attorneys

Feb. 25, 1936.　　　J. M. SIMPSON　　　2,032,335
FREEWHEELING ATTACHMENT FOR AUTOMOBILES
Filed May 4, 1931　　　4 Sheets-Sheet 4

Inventor
John M. Simpson,
By
Hood + Hahn
Attorneys

Patented Feb. 25, 1936

2,032,335

UNITED STATES PATENT OFFICE 2,032,335

FREEWHEELING ATTACHMENT FOR AUTOMOBILES

John M. Simpson, Muncie, Ind., assignor, by mesne assignments, to Borg-Warner Corporation, Chicago, Ill., a corporation of Illinois Application May 4, 1931, Serial No. 534,840

15 Claims. (Cl. 74—343)

My invention relates to improvements in transmissions and particularly to a mechanism operable in connection with an automobile transmission whereby when the momentum of the automobile causes the propeller shaft to operate at a greater speed than that of the engine the propeller shaft will be automatically disconnected. My invention is particularly applicable to that class of "free wheeling" mechanism which is interposed between the transmission or gear set and the propeller shaft.

It is one of the objects of my invention to provide means for controlling this type of free wheeling mechanism whereby the same may be rendered operative or inoperative at the will of the driver and with a minimum of effort on the part of the driver. Certain other advantages and objects will appear more fully in the appended specification and claims.

For the purpose of disclosing my invention I have illustrated one embodiment thereof in the accompanying drawings, in which:

Fig. 3 is a sectional view on the line 3—3 of Fig. 2;

Fig. 4 is a sectional view on the line 4—4 of Fig. 2;

Fig. 5 is a side elevation showing a modification of the control mechanism;

Figure 1:
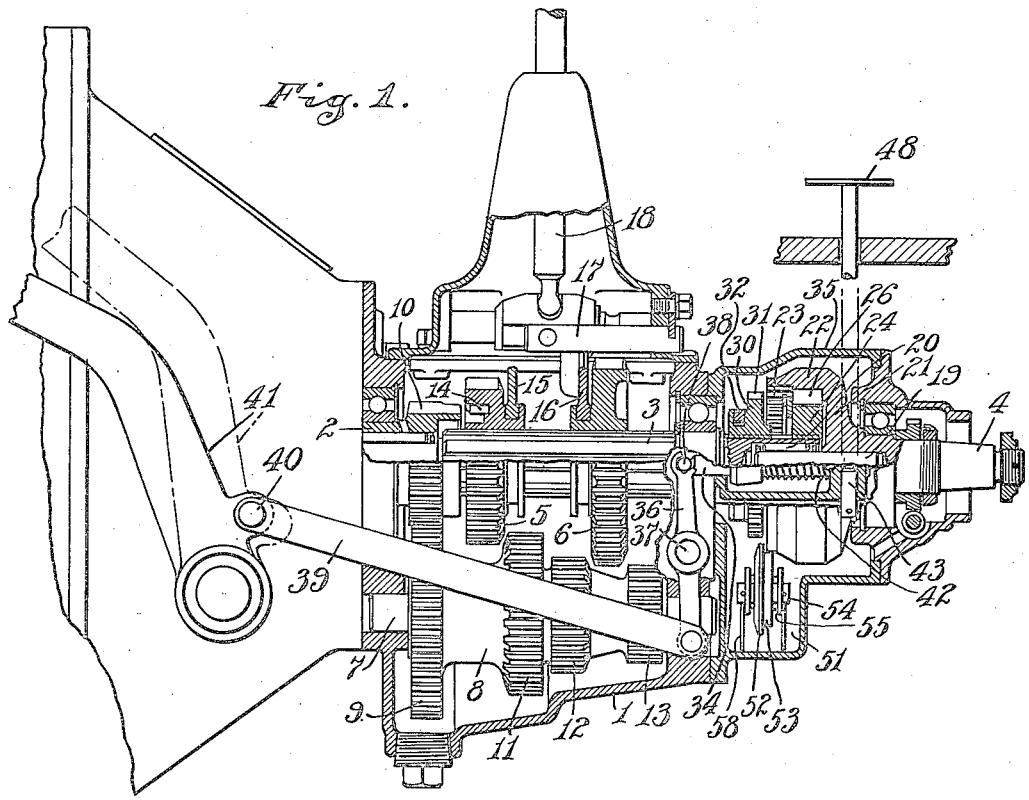
Fig. 1 is a longitudinal sectional view of a transmission embodying my invention.

In the embodiment of the invention illustrated I show the same in connection with a standard form of transmission, in which there is provided the usual housing 1 into which projects from opposite ends a driving shaft or engine shaft 2, adapted to be connected with the engine through the usual clutch, and a driven shaft 3, which in the present instance is an intermediate shaft adapted to be connected through a suitable "free wheeling" mechanism with the propeller shaft 4. The shaft 3, at its forward end is piloted in a recess in the shaft 2. This shaft 3 is provided with a second speed gear 5 and a low speed gear 6, each splined on the shaft 3 and axially shiftable thereon. A counter-shaft 7 is mounted beneath the shafts 2 and 3 and carries a spindle 8 provided with a gear 9 constantly in mesh with a gear 10 on the shaft 2. This spindle is also provided with a gear 11 adapted to be meshed with the gear 5 for second speed drive and with a gear 12 adapted to be meshed with the gear 6 for low speed drive. The gear 6 is also adapted to mesh with an idler (not shown) in turn meshing with a gear 13 on the spindle 8 for reverse drive. The gear 5 is also provided with internal clutch teeth 14 adapted to engage or mesh with the teeth 10 for directly connecting the shafts 2 and 3 for high speed drive. The gears 5 and 6 are shifted by means of suitable forks 15 and 16 on shift rods 17 operated by the usual shifter lever 18.

The shafts 3 and 4 are in axial alignment and are maintained in the aligned position by means of an extension 19 fixed in a recess in the forward end of the shaft 4 and piloted in a recess in the rear end of the shaft 3, suitable roller bearings 20 being interposed between the end of the extension 19 and the shaft. This propeller shaft 4 is provided at its forward end with an overhanging hub portion 21 constituting at 22 the outer member of an overrunning clutch and provided at its outer end with a series of internal clutch teeth 23. The inner member of the overrunning clutch preferably comprises a cammed sleeve 24 splined on the shaft 3 and having a series of cammed surfaces or portions 25. Cooperating with each of the series of cammed portions and interposed between the cammed portions and the outer member 22 of the overrunning clutch is a series of clutch rollers 26, the rollers gradually diminishing in diameter and biased towards the high side of the cam by a shoe 27 between which and a shoulder 28 is interposed a coiled spring 29. The construction and arrangement of this clutch is such that when the outer member 22 rotates in a counter-clockwise direction, looking at Fig. 4, the rollers will operate to connect the outer and inner members while, when the inner member tends to rotate at a greater speed than the outer member the relative direction of operation of the parts is such that the inner member is rotating in a counter-clockwise direction and the clutch then disconnects.

A positive clutch member 30 is splined on the shaft 3 and this positive clutch member is provided with radial teeth 31 adapted to be moved into engagement with the teeth 23 of the member 22 whereby when the teeth are engaged the shafts 3 and 4 are positively connected together and the overrunning clutch is "locked out" or rendered ineffective. This positive clutch member 30 is axially moved on the shaft 3 by means of a fork 32 operating in an annular groove in the hub 33 of the clutch member and mounted on a shift rod 34 supported in the housing 35 of the "free wheeling" mechanism.

Figure 2:
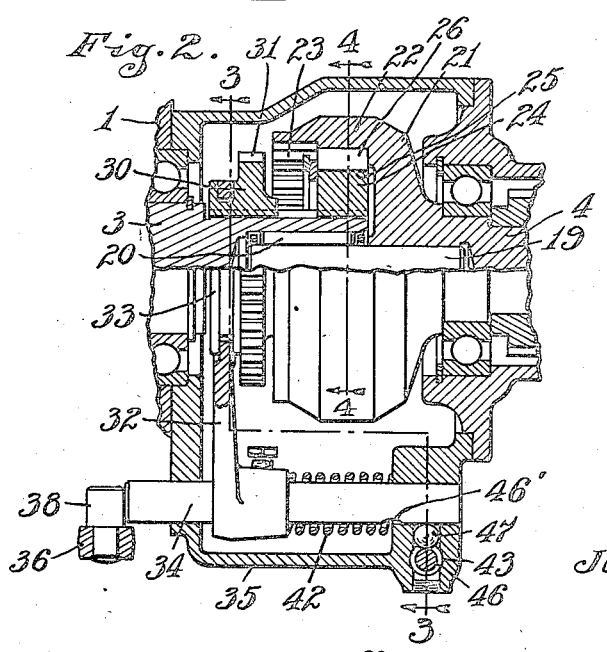
Fig. 2 is a longitudinal sectional view of the free wheeling portion of the transmission.

Under normal circumstances the parts are in the positions illustrated in Figs. 1 and 2 when the free wheeling clutch is operative so that, in event the momentum of the car operates the shaft 4 at a greater speed than the shafts 2 and 3 the overrunning clutch will operate to disconnect the shaft 4 from the shaft 3 so that, there is no driving effect on the engine shaft, and in this connection the shaft 3 may be considered a part of the engine shaft 2 or may be considered a driving shaft. It will be noted that this free wheeling clutch operates irrespective of the relationship of the gears of the transmission and is, therefore, operative whether the car is driven in high, second, low or even in reverse.

There are times when it is desired to lock out the overrunning clutch, as for instance when driving for a considerable period in extremely mountainous or hilly countries and it is desirable to rely on the braking effect of the engine in descending grades. In order that this may be accomplished readily and with the minimum effort on the part of the operator, I provide means whereby the positive clutch member 31 may be moved into engaging position by the manipulation of the clutch pedal. To this end a lever 36 is pivoted as at 37 on the side of the transmission housing 1 and is provided at one end with a pin 38 located in the path of the shift rod 34. The opposite end of this lever is connected by a link 39 and a pivoted connection 40 with the clutch lever 41. Normally when the clutch lever 41 is in its raised or "in" position, the pin 38 is spaced from the end of the shift rod 34 a sufficient distance so that the clutch pedal may be depressed and the clutch thrown out to permit the shifting of the gears without the pin engaging the end of the rod 34. If, however, at any time it is desired to lock out the overrunning clutch a continued depression of the clutch pedal will so rock the lever 36 as to cause the pin 38 to engage the end of the rod 34 shifting the clutch member 30 until its teeth mesh with the teeth 23 of the member 21, thus positively connecting the shafts 3 and 4. Due to the fact that there is a one-way connection only between the shift rod 34 and the pin 38, when the clutch pedal is released and the clutch lever 41 allowed to move back to its normal or "in" position the rod will remain in its shifted position and the parts in their locked up relation so that, the overrunning clutch will remain locked out without further attention on the part of the operator as long as desired.

It is, of course, desirable after the overrunning clutch has been "locked out" to provide means whereby it may again become effective and the "lock out" clutch released. To this end a coil spring 42 surrounding the shifter rod 34 and interposed between the fork 32 and the casing 35 tends to move the shifter rod in a position to maintain the clutch member 30 in its retracted or non-engaging position. For locking the rod in its projected position I provide a lock rod 43 biased in its raised position by a coil spring 44 interposed between a collar 45 and the casing 35. This rod is provided with an annular groove 46 into which will take a locking ball 47, interposed between the rod and the shift rod 34, when the shift rod 34 is in its retracted position. When, however, the shift rod is moved into its projected position to engage the teeth 31 and 23, a groove or recess 46' is brought opposite the ball 47 permitting the ball to disengage from the groove 46, under the tendency of the spring 44 to raise the rod 43. The movement of the ball 47 into the recess 46' will then prevent movement of the shift rod 34, due to the fact that the ball is held in this position by the larger part of the rod 43 which has been raised to its position with the lifting of the rod 43. The shift rod 34 is thus locked against the bias of the spring 42 until it is released and, therefore, the lock out clutch is maintained in its locked out position until it is desired that the free wheeling mechanism be again thrown into operative relation. The depression of the rod 43 by the operator will bring the groove 46 opposite the ball 47 permitting the ball to move out of the recess 46' thus releasing the shift rod 34 and permitting it under the influence of the coil spring 42 to move to its retracted position carrying with it the lock out clutch member 30 and thus throwing the free wheeling mechanism into operative relation.

The means for manipulating, or depressing, the rod 43 may be in the form of a foot treadle 48 on top of the rod 43, which may be extended for this purpose, and which will be placed in juxtaposition to the driver's seat. If desired, however, the rod may be manipulated from the shift lever by the provision of a bell crank lever 49 pivoted on a bracket 50 on top of the housing 35, one end of this lever being adapted to bear on the top of the rod 43 and the other end being connected by a Bowden wire 43' with a push button 48' located in the top of the shift lever 18. The Bowden wire may be led to any position desired and may even terminate on the dash of the automobile or in any other position convenient to the operator.

In order that the clutch parts of the free wheeling mechanism may be suitably lubricated I provide a lubricating well 51 in the bottom of the housing 35 and arranged in this well is an oil conductor or splash wheel 52 having a rim 53 bearing upon the outer periphery of the member 22 in order that the wheel will be rotated with this member. The wheel 52 is mounted upon a pin 54 supported between a pair of links 55 pivotally mounted upon a pin 56 secured to a stud 57 mounted on the frame and these links, constituting a yoke, are maintained in their raised positions with the rim 53 in engagement with the member 22 by means of a spring 58, one end 59 of which bears on the casing and the other end of which is secured to the yoke. By this arrangement the rapid rotation of the wheel 52 will throw the oil from the well 51 upon the clutch parts maintaining them properly lubricated.

Figure 6:
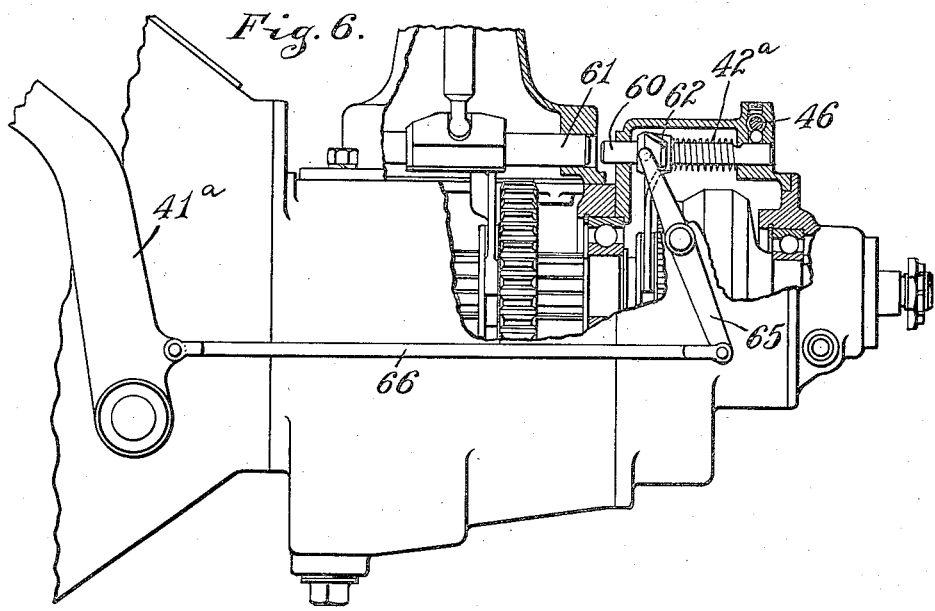
Fig. 6 is a side elevation, partially in section, of a transmission illustrating a modification of my invention.
Figure 7:
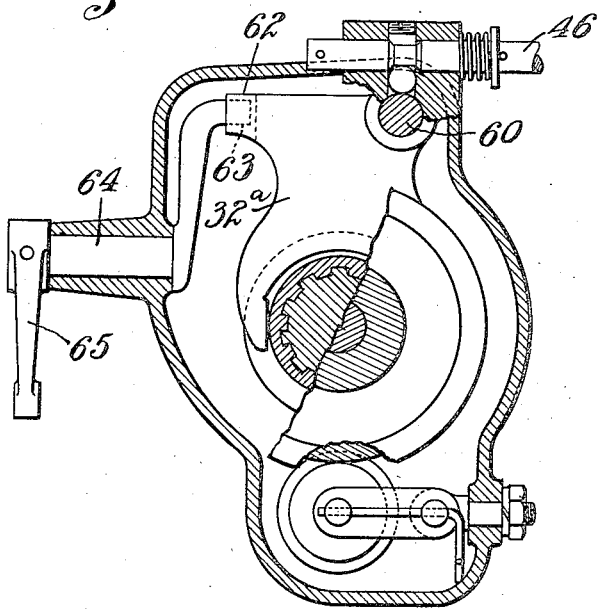
Fig. 7 is a transverse view thereof showing particularly the manipulating mechanism.

I have illustrated in Figs. 6 and 7 a modified construction, having particular reference to the lock out clutch operating mechanism. In this structure the shifting fork 32a corresponding to the shifting fork 32 for manipulating the lock out clutch member 30 is mounted on a shifter rail 60 biased in its retracted position by a retracting spring 42a. This rail 60 is in axial alignment with the shifter rail 61, by which the gear 6 is shifted on the shaft 3 and is in such a position that when the gear 6, through the manipulation of the shift rail 61, is shifted to the rear, of the transmission, for meshing with the idler, meshing with the gear 13, for reverse drive it, the rail 60, will be engaged by the rail 61 and moved to shift the lock out clutch in lock out position against the tension of the spring 42a. The means for maintaining the shift rail 60 in the lock out position is similar to that for maintaining the shift rail 34 in lock out position and includes the manipulating rod 46.

In order that the lock out clutch may be manipulated by the operation of the engine clutch pedal 41a, in the same manner as provided for in the structure illustrated in Figs. 1 to 5 inclusive, the shifter fork 32a is provided with an extension 62 which lies in the path of the end 63 of a crank 64. The arm 65 of this crank is connected by a link rod 66 with the engine clutch pedal 41a so that, when the engine clutch pedal is depressed beyond its normal position, the shift rod 60, and the lock out clutch, will be manipulated to lock out position.

If desired the releasing mechanism may be manipulated in the same manner as shown in Fig. 5.

Figure 8:
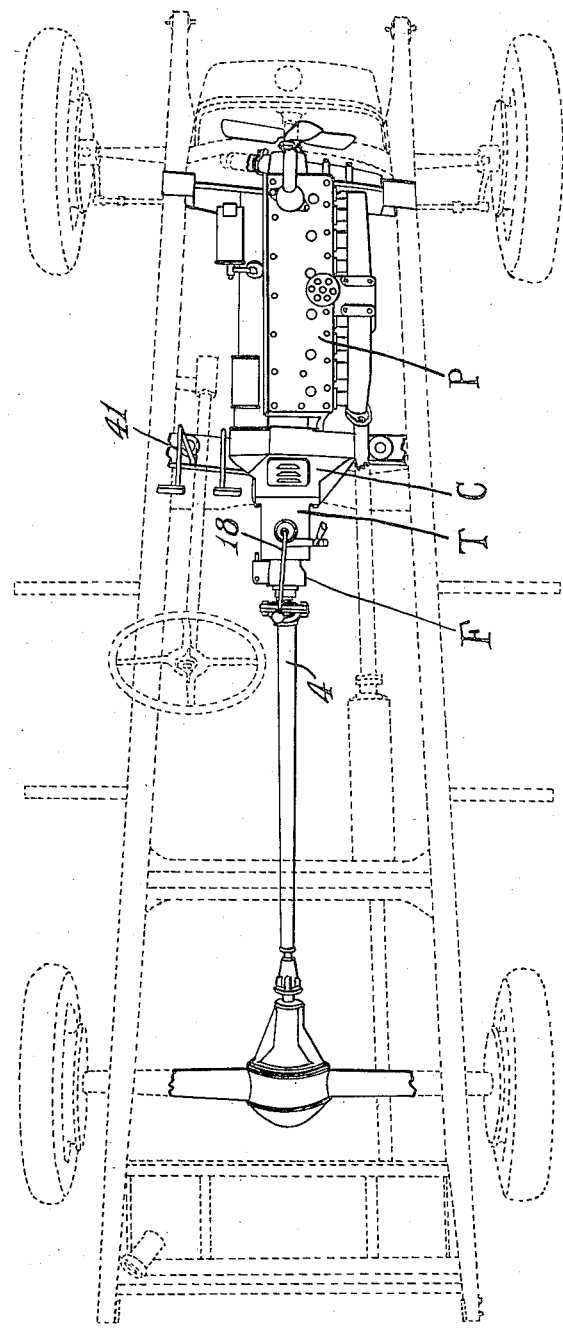
Fig. 8 is a plan view showing the relation of the parts in a vehicle.

In Fig. 8 I have shown more or less diagrammatically the relation of the various parts heretofore described in connection with an automobile power plant. In this figure the power plant or engine is shown at P. The engine clutch for connecting the engine shaft with the transmission is shown at C, which clutch is associated with the transmission illustrated at T at the rear end of which is arranged the free wheeling mechanism F, which mechanism as heretofore illustrated, is connected with the propeller shaft 4. The engine clutch pedal 41 is shown as being mounted at the side of the clutch housing and as illustrated at Fig. 1 is adapted to be connected through suitable linkage connected with the free wheeling device F and the gear shifter lever 18 is shown on the transmission housing T.

I claim the following:

1. In a motor vehicle, the combination with a power plant, of a propeller shaft, an engine clutch interposed between said power plant and said propeller shaft, a transmission for operating said propeller shaft at a plurality of speeds and in a reverse direction interposed between said power plant and propeller shaft, means for affording a one-way drive from said power plant to the propeller shaft, means for locking out said last mentioned means to effect a two-way drive between the power plant and the propeller shaft, means biasing said lock out means in one direction, means operated by either the operating means for the engine clutch or for the transmission for placing said biasing means under tension, means for restraining the operation of said lock out means under the influence of said biasing means and means operated from the transmission operating means for releasing said restraining means.

2. In a device of the character described, the combination with a propeller shaft, of a transmission gearing for driving said propeller shaft at a plurality of forward speeds and in a reverse direction, an overrunning clutch interposed between said gearing and propeller shaft, means for locking out said overrunning clutch and connecting said gearing and propeller shaft to cause the same to operate together irrespective of the direction of the rotation of the propeller shaft, and biased toward inoperative position, means operated by the engine clutch operating lever for moving said lock out means to operative position, said movement being unaffected by the normal movement of said clutch lever in connecting and disconnecting the clutch, means for locking said lock out means in its operative position and means within the reach of the operator for releasing said locking means.

3. In a transmission, in combination, a shaft, gearing for driving said shaft including an axially shiftable gear for driving said shaft in a reverse direction, a shift fork for shifting said reverse gear, an overrunning clutch interposed between said shaft and the propeller shaft of the vehicle, the member of said overrunning clutch connected to the propeller shaft having radially extending positive clutch teeth formed thereon, a positive clutch member rotatably fixed to said first mentioned shaft and axially slidable relatively thereto and having radially extending clutch teeth for engagement with the clutch teeth of the propeller shaft clutch member, a shift fork for operating said positive clutch member, a spring for biasing said positive clutch member toward inoperative position, an operating rod interposed between said positive clutch shift fork and said gear shift fork and its rod, for moving said positive clutch member into operative position against the action of said spring when the gear shift fork shifts the reverse gear into driving position, said spring being adapted to move the positive clutch member into disengaging position when the reversing gear shift fork is moved forward beyond a position to engage the reverse driving gear, operator manipulated means for operating said shift fork, and connections between said operator manipulated means and the shift fork permitting the operation of the positive clutch fork by the gear shift fork without affecting the operator manipulated means.

4. In a transmission, in combination, a shaft, gearing for driving said shaft including an axially shiftable gear for driving said shaft in a reverse direction, a shift fork for shifting said reverse gear, an overrunning clutch interposed between said shaft and the propeller shaft of the vehicle, the member of said overrunning clutch connected to the propeller shaft having radially extending positive clutch teeth formed thereon, a positive clutch member rotatably fixed to said first mentioned shaft and axially shiftable relatively thereto and having radially extending clutch teeth for engagement with the clutch teeth of the propeller shaft clutch member, a shift fork for operating said positive clutch member, a spring for biasing said positive clutch member toward inoperative position, an operating rod interposed between said positive clutch shift fork and said gear shift fork for moving said positive clutch member into operative position against the action of said spring when the gear shift fork shifts the reverse gear into driving position, said spring being adapted to move the positive clutch member into disengaging position when the reversing gear shift fork is moved forward beyond a position to engage the reversing driving gear, and self-locking operator manipulating means for moving the clutch member in operative position against the action of the spring and independently of the gear shift means.

5. In a transmission, in combination, a shaft, gearing for driving said shaft including an axially shiftable gear for driving said shaft in a reverse direction, a shift fork for shifting said reverse gear, an overrunning clutch interposed between said shaft and the propeller shaft of the vehicle, the member of said overrunning clutch connected to the propeller shaft having radially extending positive clutch teeth formed thereon, a positive clutch member rotatably fixed to said first mentioned shaft and axially shiftable relatively thereto and having radially extending clutch teeth for engagement with the clutch teeth of the propeller shaft clutch member, a shift fork for operating said positive clutch member, a spring for biasing said positive clutch member toward inoperative position, an operating rod interposed between said positive clutch shift fork and said gear shift fork for moving said positive clutch member into operative position against the action of said spring when the gear shift fork shifts the reverse gear into driving position, said spring being adapted to move the positive clutch member into disengaging position when the reversing gear shift fork is moved forward beyond a position to engage the reversing driving gear and a self-locking operator manipulating means for moving the positive clutch member in operative position against the action of the spring and independently of the gear shift means, said self-locking means including a Bowden wire for causing the positive clutch member to move into inoperative position.

6. In a transmission, the combination, a shaft, gearing for driving said shaft including an axially shiftable gear for driving said shaft in a reverse direction, a shift fork for shifting said reverse gear, an overrunning clutch interposed between said shaft and the propeller shaft of the vehicle, the member of said overrunning clutch connected to the propeller shaft having radially extending positive clutch teeth formed thereon, a positive clutch member rotatably fixed to said first mentioned shaft and axially slidable relatively thereto and having radially extending clutch teeth for engagement with the clutch teeth of the propeller shaft clutch member, a shift fork for operating said positive clutch member, a spring for biasing said positive clutch member toward inoperative position, means operated by the shifting of said first mentioned shift fork and its rod to move the gearing into reverse drive for shifting said positive clutch member against the action of said spring and into operative position, said spring being adapted to move the operative clutch member into disengaging position when the reverse gear shift fork is moved forward beyond a position to engage the reversing driving gear, a stub shaft, a crank arm mounted on said stub shaft and operatively connected with the positive clutch member shift fork, a second crank arm connected to said stub shaft and operator controlled means connected to said second mentioned crank arm for operating the positive clutch shift fork independently of the reversing gear shift means and against the action of said spring.

7. In a transmission, in combination, a shaft, gearing for driving said shaft including an axially shiftable gear for driving said shaft in a reverse direction, an overrunning clutch interposed between said shaft and the propeller shaft of the vehicle to effect a one-way drive from said shaft to the propeller shaft, means for locking out said overrunning clutch to effect a two-way drive between said shaft and propeller shaft, means biasing said lock out means to inoperative position, means operated by the shifting of said reverse gear to move said lock out means to operative position and against said biasing means, operator control means for moving said lock out means to operative position against the action of said biasing spring, a latch for holding said lock out means in operative position against action of said biasing means and means for releasing said latch including a Bowden wire extending to a position readily reached by the hand of the operator during hand operation of the gear shift mechanism.

8. In a transmission, in combination, a shifting gearing for driving said shaft including an axially shiftable gear for driving said shaft in a reverse direction and a manually operable control lever, an overrunning clutch interposed between said shaft and the propeller shaft of the vehicle for affording a one-way drive between said shaft and the propeller shaft, means for locking out said overrunning clutch to effect a two-way drive between the shaft and the propeller shaft, means for biasing said lock out means to inoperative position, means operated by the shifting of said gear to reverse drive position for moving said lock out means to operative position, a second means for moving said lock out means to operative position against the action of said biasing means and independently of said first mentioned means, a latch for maintaining said lock out means in operative position and Bowden wire control means mounted on said control lever for releasing said latch.

9. In a transmission, in combination, a shaft, gearing for driving said shaft including an axially shiftable gear for driving said shaft in a reverse direction, an overrunning clutch interposed between said shaft and the propeller shaft of the vehicle for effecting a one-way drive from the shaft to the propeller shaft, means for locking out said overrunning clutch to effect a two-way drive between the shaft and the propeller shaft, a shift rod, a shift fork mounted on said shift rod and engaging said lock out means for operating the same, a coiled spring surrounding said shift rod and biasing said lock out means to inoperative position, means operated by the shifting of said reversing gear into reverse drive position for moving said shift fork and with it the lock out means to operative position against the action of said spring, a second means for moving said shift fork and lock out means to operative position independently of said first mentioned means, a latch engaging said shift rod for maintaining the lock out means in operative position and a Bowden wire extending to within convenient reach of the operator for releasing said latch when it is desired to move said lock out means to inoperative position.

10. In a transmission, in combination, a casing, a shaft journalled in said casing, gearing within said casing for driving said shaft including an axially shiftable gear for driving said shaft in the reverse direction, a second casing mounted at the rear of said first mentioned casing and into which one end of said shaft projects, an overrunning clutch mounted within said second casing for effecting a one-way drive between said shaft and a propeller shaft for the vehicle, means within said second casing for locking out said one-way clutch to effect a two-way drive between said shafts, a shift rod slidably mounted in said casing, a shift fork mounted on said rod and engaging said lock out means, a coiled spring surrounding said shift rod and biasing said lock out means to inoperative position, means operated by the movement of said reversing gear into driving position for operating said shift fork to move said lock out means into operative position and against the action of said coiled spring, a second means for operating said shift fork to move the lock out means to operative position against the action of said spring independently of said first means, a latch member mounted in said casing for engaging said shift rod to hold the lock out means in operative position and a flexible member extending to convenient reach of the operator for releasing said latch means.

11. In a transmission, in combination, a shaft, gearing for driving said shaft including an axially shiftable gear for driving said shaft in a reverse direction, a shift fork for shifting said reverse gear, an overrunning clutch interposed between said shaft and the propeller shaft of the vehicle, the member of said overrunning clutch connected to the propeller shaft having positive clutch teeth formed thereon, a positive clutch member rotatably fixed to said first mentioned shaft and axially shiftable relatively thereto and having clutch teeth for engagement with the clutch teeth of the propeller shaft clutch member, a shift fork for operating said positive clutch member, a spring for biasing said positive clutch member toward inoperative position, an operating rod interposed between said positive clutch shift fork and said gear shift fork for moving said positive clutch member into operative position against the action of said spring when the gear shift fork shifts the reverse gear into driving position, said spring being adapted to move the positive clutch member into disengaging position when the reversing gear shift fork is moved forward beyond a position to engage the reversing driving gear and a self-locking operator manipulating means for moving the positive clutch member in operative position against the action of the spring and independently of the gear shift means, said self-locking means including a Bowden wire for causing the positive clutch member to move into inoperative position.

12. In a transmission, the combination, a shaft, gearing for driving said shaft including an axially shiftable gear for driving said shaft in a reverse direction, a shift fork for shifting said reverse gear, an overrunning clutch interposed between said shaft and the propeller shaft of the vehicle, the member of said overrunning clutch connected to the propeller shaft having positive clutch teeth formed thereon, a positive clutch member rotatably fixed to said first mentioned shaft and axially slidable relatively thereto and having clutch teeth for engagement with the clutch teeth of the propeller shaft clutch member, a shift fork for operating said positive clutch member, a spring for biasing said positive clutch member toward inoperative position, means operated by the shifting of said first mentioned shift fork and its rod to move the gearing into reverse drive for shifting said positive clutch member against the action of said spring and into operative position, said spring being adapted to move the operative clutch member into disengaging position when the reverse gear shift fork is moved forward beyond a position to engage the reversing driving gear, a stub shaft, a crank arm mounted on said stub shaft and operatively connected with the positive clutch member shift fork, a second crank arm connected to said stub shaft and operator controlled means connected to said second mentioned crank arm for operating the positive clutch shift fork independently of the reversing gear shift means and against the action of said spring.

13. In combination, an engine clutch having a manually operated control pedal, a transmission driven through said clutch having a driven shaft and a manually operated gear shift lever, an overrunning clutch associated with the driven shaft of said transmission, normally ineffective means for establishing a two-way drive between the elements of said overrunning clutch, means actuated by a movement of said control pedal for rendering said last named means effective, and means, including a manually operated member, mounted on said shift lever, for releasing said two-way drive means from its effective position.

14. In a motor vehicle, a transmission having shiftable change speed gears and including a driven shaft, a manual control member for shifting said transmission gears at will, a second control member adapted for manual manipulation by the operator during the normal driving of the vehicle, a normally operative overrunning clutch associated with said transmission driven shaft, a normally ineffective lock out mechanism for said overrunning clutch, means operated by a predetermined movement of said second named manual control member for rendering said lock out mechanism effective, and means, including a manually operable member mounted on said first named control member, for releasing said lock out mechanism from its effective position, whereby the overrunning clutch is made operative.

15. In a motor vehicle, a transmission having shiftable change speed gears including reverse drive gears and a driven shaft, a manual control member for shifting said transmission gears at will, a second control member adapted for manual manipulation by the operator during the normal driving of the vehicle, a normally operative overrunning clutch associated with said transmission driven shaft, a normally ineffective lock out mechanism for said overrunning clutch, means operable to render said lock out mechanism effective during the time that said reverse gears of said transmission are shifted into operative position, means operated by a predetermined movement of said second control member to render said lock out mechanism effective, and means, including a manually engageable member, mounted on said first named control member, for releasing said lock out mechanism from its effective position, whereby the overrunning clutch is made operative.

JOHN M. SIMPSON.